United States Patent
Gierachf

(10) Patent No.: US 7,092,515 B2
(45) Date of Patent: Aug. 15, 2006

(54) VC-TO-DTMF INTERFACING SYSTEM AND METHOD

(75) Inventor: Karl Gierachf, Irvine, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 152 days.

(21) Appl. No.: 10/655,881

(22) Filed: Sep. 6, 2003

(65) Prior Publication Data

US 2005/0053230 A1    Mar. 10, 2005

(51) Int. Cl.
  *H04M 11/00*    (2006.01)
(52) U.S. Cl. ............................. 379/406.01; 379/88.04; 379/88.18
(58) Field of Classification Search ........... 379/406.01, 379/88.01–88.04, 88.17–88.18, 88.22–88.23
  See application file for complete search history.

(56) References Cited

U.S. PATENT DOCUMENTS

| | | | | |
|---|---|---|---|---|
| 6,601,031 B1* | 7/2003 | O'Brien | ................... | 704/270.1 |
| 6,757,379 B1* | 6/2004 | Lane | ...................... | 379/387.01 |
| 2002/0090066 A1* | 7/2002 | Gupta et al. | ............. | 379/88.03 |
| 2002/0097848 A1* | 7/2002 | Wesemann et al. | ...... | 379/88.18 |
| 2003/0021394 A1* | 1/2003 | Krack | ...................... | 379/88.01 |
| 2004/0218737 A1* | 11/2004 | Kelly | ...................... | 379/88.18 |

\* cited by examiner

*Primary Examiner*—Sinh Tran
*Assistant Examiner*—Walter F Briney, III
(74) *Attorney, Agent, or Firm*—Joseph E. Levi, Esq.; Anapoly S. Weiser, Esq.

(57) ABSTRACT

A voice command (VC)-to-DTMF interfacing system that allows existing DTMF-driven systems to be interacted with by a caller using voice commands. The VC-to-DTMF interfacing system translates the voice command from a caller into the DTMF codes which are then played through a port for receipt by the DTMF-driven system. In a first mode, the voice commands from the caller and the pre-recorded messages of the DTMF-driven system are echo cancelled. In a second mode, a voice message is directly streamed to the DTMF-driven system through an enabled port patch.

13 Claims, 8 Drawing Sheets

MODE 1

MODE 2

PROMPT AND COLLECT PROCEDURE

STREAMING PROCEDURE

STREAMING PROCEDURE

VC-TO-DTMF INTERFACING SYSTEM AND METHOD

FIELD OF THE INVENTION

The present invention pertains to legacy dual-tone multi-frequency (DTMF) systems and, more particularly, to an voice command to dual tone multi-frequency (VC-to-DTMF) interfacing system that allows an existing DTMF driven legacy system to be voice responsive.

BACKGROUND OF THE INVENTION

There are many DTMF-driven voice mail systems utilized throughout the corporate world. Typically, a caller uses the telephone keypad to navigate the menus of the DTMF-driven voice mail system to access the desired functions. These systems act as a centralized receptionist that enables callers to leave messages for an unavailable called party and enables the called party to retrieve their messages remotely.

Often, it is cumbersome for a caller to have to use the telephone keypad for accessing and navigating a traditional voice mail system. For example, cellular phones are becoming increasingly smaller and it is often difficult to press the correct keypad keys (that correspond to the required DTMF codes), especially while driving. Accordingly, it is desirable to provide a system that allows callers to interact with a DTMF-driven voice mail system using voice commands for providing hands-free operation.

SUMMARY

The present invention contemplates a voice command to dual tone multi-frequency (VC-to-DTMF) interfacing system that converts voice commands received at a first port into a DTMF code and sends the DTMF code to a second port during a first mode. Moreover, the VC-to-DTMF interfacing system echo cancels audio communications between the first and second ports during the first mode where prompt and collect sessions between a caller and the DTMF-driven system take place.

The present invention contemplates a VC-to-DTMF interfacing system that patches a voice message from the caller for storage by the DTMF-driven system in a second mode.

DETAILED DESCRIPTION OF THE INVENTION

Figure 1:
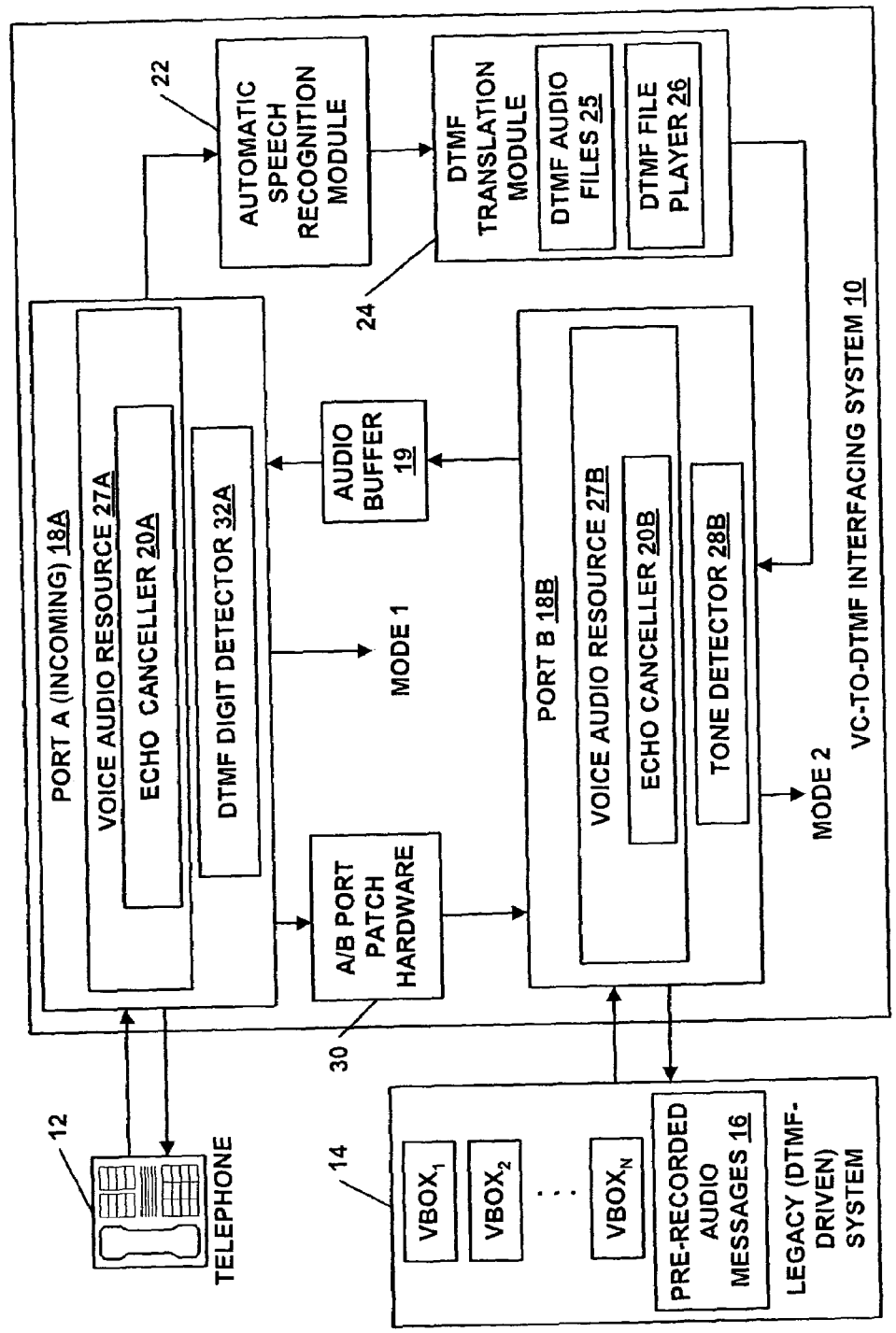
FIG. 1 illustrates an overall block diagram of the VC-to-DTMF interfacing system in accordance with the present invention.

Referring now to FIG. 1, the VC-to-DTMF interfacing system 10 is constructed and arranged to allow a person or caller to interact with an existing legacy DTMF-driven system 14 with voice commands (voice responsive). Conventionally, navigation through the DTMF-driven system 14 is accomplished through providing predetermined DTMF codes (by pressing the corresponding telephone keypad keys) to access a particular extension, leave a recorded message in one of a plurality of voice mail boxes $VBOX_1$, $VBOX_2$, ... $VBOX_N$, or retrieve recorded messages in one of the plurality of voice mail boxes $VBOX_1$, $VBOX_2$, ... $VBOX_N$. In addition, other functions may be provided depending on the particular underlying voice mail system.

Typically, when interfacing with DTMF-driven system 14, the DTMF-driven voice mail system 14 includes a plurality of predetermined pre-recorded audio messages 16 for prompting the caller to enter the necessary DTMF code for navigation through system 14. More specifically, during a call or session, the DTMF-driven system 14 begins interaction with the caller with a pre-recorded audio message that prompts the caller to dial certain keypad keys (that generate various DTMF) to navigate to the desired function. This dialog of communicating a pre-recorded audio message is then followed by the receipt and translation of dialed digits for navigation. The pre-recorded audio message and dialed digit combination will hereinafter be referred to as "prompt and collect session".

It should be noted that several prompt and collect sessions may be required to navigate through the DTMF-driven system 14 to complete the call session. The VC-to-DTMF interfacing system 10 allows the dialed digits of the prompt and collect session to be substituted with voice commands.

The VC-to-DTMF interfacing system 10 detects a voice command spoken by a caller, in lieu of a predetermined DTMF code, via an automatic speech recognition module 22. In cooperation with the automatic speech recognition (ASR) module 22, a DTMF translation module 24 translates the detected voice command into the corresponding predetermined DTMF code and communicates the predetermined DTMF code to port B for receipt by the DTMF-driven system 14. In this way, the caller can use voice commands instead of the keypad keys to navigate voice mail system 14.

Referring now to the DTMF translation module 24, the DTMF translation module 24 includes a plurality of audio files 25 Page: 6 [0](where each file contains a unique DTMF tone, e.g. 0–9, *, and #). The ASR module 22[0] is used by the DTMF translation module 24 wherein the digital output (e.g. recognized voice command) produced by the ASR module 22 is mapped to a DTMF sequence fulfilling the requirement of controlling the DTMF-driven system 14 as intended. It should be noted that the ASR module 22 is enabled with a specific grammar set to control the DTMF-driven system 14. The DTMF translation module 24 is configured to map each phrase in this grammar set to a particular DTMF sequence. Once the DTMF translation module 24 determines the DTMF tones of the DTMF sequence that correspond to the voice command interpreted by ASR module 22, the DTMF player 26 plays those DTMF tones through the port B 18B in the order of the DTMF sequence. For example, if the caller speaks the last name of a person associated with a voice mail box in voice mail system 14 (such as to leave a message), the ASR module 22 receives the spoken last name in raw audio format and converts it into a digital representation. DTMF translation module 24 then uses the digital representation to lookup the corresponding DTMF tones (that may include the called person's extension plus the necessary navigation tones to access the voice mail box. DTMF player 26 then plays those DTMF tones through port B 18B which directs voice mail system 14 to the extension of the person having the spoken last name.

In mode 1, the VC-to-DTMF interfacing system 10 receives a call from a caller using telephone 12 at and incoming port A 18A. The system 10, allocates a port B 18B for connection to the DTMF-driven system 14. In mode 1, a caller can retrieve stored voice messages from an assigned one of voice mail boxes $VBOX_1, VBOX_2, \ldots VBOX_N$ such as, without limitation, by uttering a "password" [0](comprised of a sequence of spoken digits) when asked by the DTMF-driven system 14 and uttering the voice command "retrieve messages" or "play passages" when asked via a prompt and collect session. As can be appreciated, the order for entering the voice commands for carrying out various functions within the DTMF-driven system 14 would be a function of such system 14.

During communications, the audio from port B 18B is echo cancelled, via echo canceller 20B of voice-audio resource 27B and fed to the voice-audio resource 27A of port A 18A, allowing the caller to hear the stored or pre-recorded audio message from the DTMF-driven system 14. Simultaneously, the speech (audio) from port A 18A is echo cancelled, via echo canceller 20A of voice-audio resource 27A, and fed into the automatic speech recognition (ASR) module 22. Results from the voice recognition module 22 are translated into an appropriate DTMF ordered sequence via the DTMF translation module 24 and played at port B 18B for receipt by DTMF-driven system 14.

In summary, in mode 1, the caller and DTMF-driven system 14 engages in at least one and, oftentimes several, prompt and collect sessions until the call session is terminated. Of course, a call session can be terminated by the caller at any time by hanging up the handset of telephone 12 wherein a hangup would be detected.

The echo cancellation effectively separates the outgoing and incoming audio from a phone port. Normally, on a traditional telephony board, the outgoing and incoming audio are mixed together. Accordingly, the echo cancellation of the audio from port A allows the ASR module 22 to receive the voice command from the caller without intermixed audio from the DTMF-driven system 14 sent through port B 18B. Because the audio from the port B 18B is also echo cancelled, the caller does not hear a break in audio from the DTMF-driven system 14. The echo cancellation of audio from port B 18B allows the transmission of DTMF tones without the caller hearing them at telephone 12.

APage: [0]udio buffer 19 is used in mode 1, however it is used to buffer the audio as it is outputted from the echo-canceller 20B of voice-audio resource 27B of port B 18B. From the audio buffer 19, the audio is played through the voice-audio resource of port A 18A, thereby enabling the caller at telephone 12 to hear the audio from the DTMF-driven system 14. The use of the audio buffer 19 also allows the system 10 to mix in additional audio cues to the caller for the purpose of indicating the state of the system 14, e.g. when the system 14 is ready for a voice command.

During the prompt and collect sessions (mode 1), A/B port patch 30 is disabled and is implemented in hardware. When the DTMF-driven system 14 is ready to have a message (audio) sent from a caller (port A 18A), a pre-recorded audio message is first communicated to the caller instructing them to "leave a message after the tone." Such pre-recorded audio message is typically, immediately followed by a special (universal) tone well known for its purpose. When the special (universal) tone is detected by tone detector 28B of port B 18B, the VC-to-DTMF interfacing system 10 switches to mode 2 (streaming mode).

Figure 2:
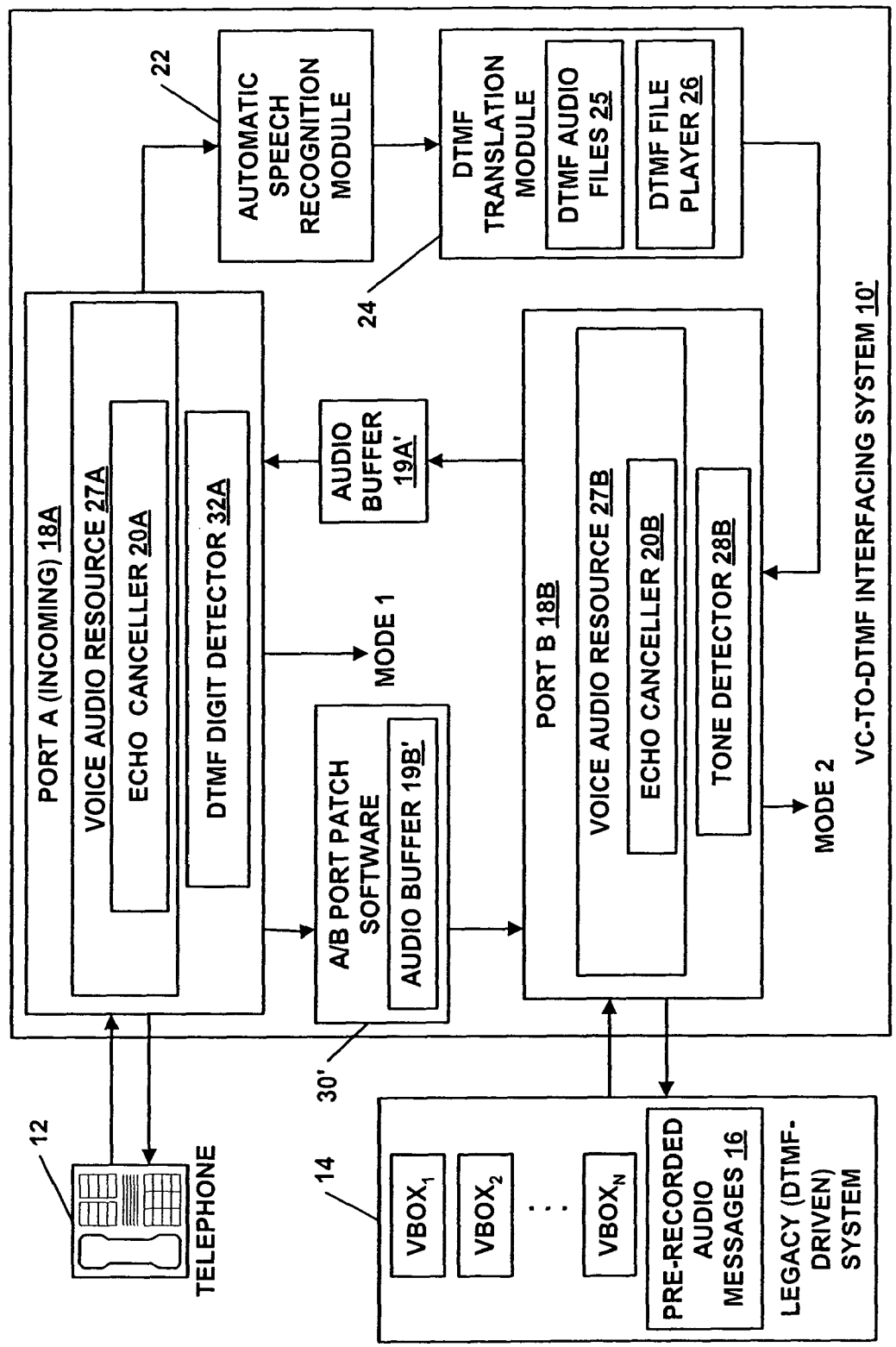
FIG. 2 illustrates the block diagram of the VC-to-DTMF interfacing system in accordance with an alternate embodiment of the present invention.

Referring now to FIG. 2, an alternate embodiment of the VC-to-DTMF interfacing system 10' is shown. Only those components which differ will be now described. In FIG. 2, the A/B port patch 30' is implemented via software. In such case, the A/B port patch 30' is shown to include an audio buffer 19B'. The audio buffer 19B' is used in conjunction with the A/B port patch 30', since the A/B port patch 30' is not supported on the telephony board's physical hardware (e.g. SCBus). Audio buffer 19B' is used to hold audio data as it is echo-cancelled from echo-canceller 20A of port A 18A and then played or sent to port B 18B. Audio buffer 19A' functions similar to audio buffer 19 of FIG. 1. It should be noted that audio buffer 19A' and 19B' may be incorporated into a single audio buffer unit or may be separate.

Referring again to FIG. 1, some telephony boards are capable of patching two ports together, e.g. SCBus in which case the audio buffer 19 is unused in mode 2. The A/B port patch 30 from port A to port B is disconnected upon detection of a predetermined DTMF digit from port A 18A via the DTMF digit detector 32A. In the exemplary embodiment, the caller will be instructed to enter a "#" to signal the end of a voice message. Immediately thereafter, mode 1 is then resumed or the call may be terminated by the caller.

Alternatively, keyword spotting could also be used in mode 2, in which case the ASR module 22 would remain active. Keyword spotting would be used to identify a specific keyword-phrase that would terminate the voice message, thereby making the system completely hands-free.

Figure 3:
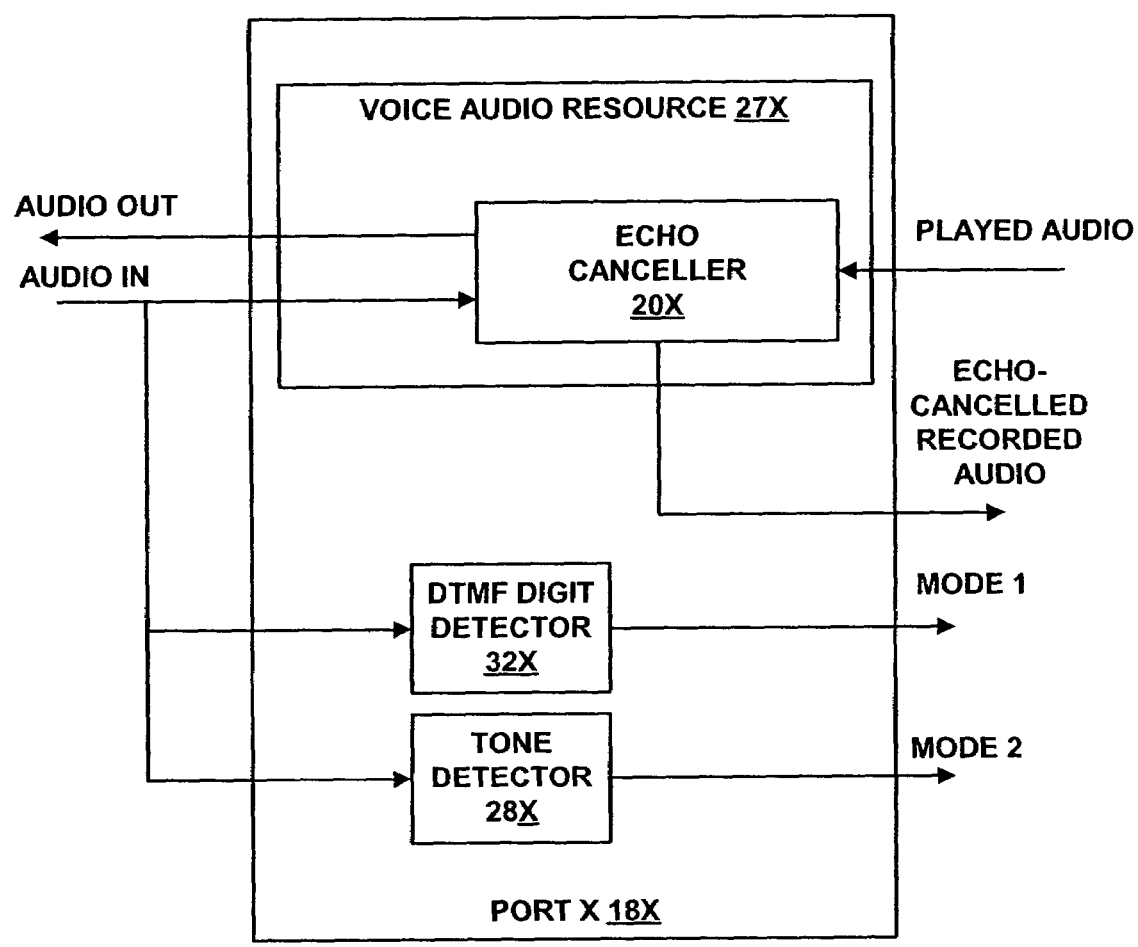
FIG. 3 illustrates the block diagram of a port in accordance with the present invention.

Referring now to FIG. 3, the block diagram of a port X 18X in accordance with the present invention is shown. Accordingly, port A 18A and port B 18B having the same capabilities but different configurations when allocated. The configuration of port X 18X will function in the manner shown in FIGS. 1 or 2 depending on which port (port A) is allocated to the telephone 12 and port (port B) is allocated to the system 14. Port X 18X includes a voice-audio resource 27X having an echo-canceller 20X. The voice-audio resource 27X is capable of receiving audio in (AUDIO IN) from the telephone 12 or system 14. The voice-audio resource 27X also is capable of outputting audio (AUDIO OUT) to the telephone 12 or system 14. Furthermore, the voice-audio resource 27X is capable of receiving played audio (PLAYED AUDIO) from the DTMF file player 26. Finally, the echo-canceller 20X outputs echo-cancelled recorded audio to audio buffer 19 (FIG. 1) or audio buffer 19A' and 19B'.

Port X 18X also includes a DTMF digit detector 32X and a tone detector 28X. When port X is allocated to port A the DTMF digit detector 32X is enabled. The DTMF digit detector 32X function to detect a DTMF digit to transition from mode 2 to mode 1. Additionally, if the caller simply does not want to utter voice commands, the DTMF digit detector 32A can directly pass the DTMF digits entered on a keypad to the DTMF-driven system 14. On the other hand, when the port X is allocated to port B the tone detector 28X is enabled.

Figure 4A:
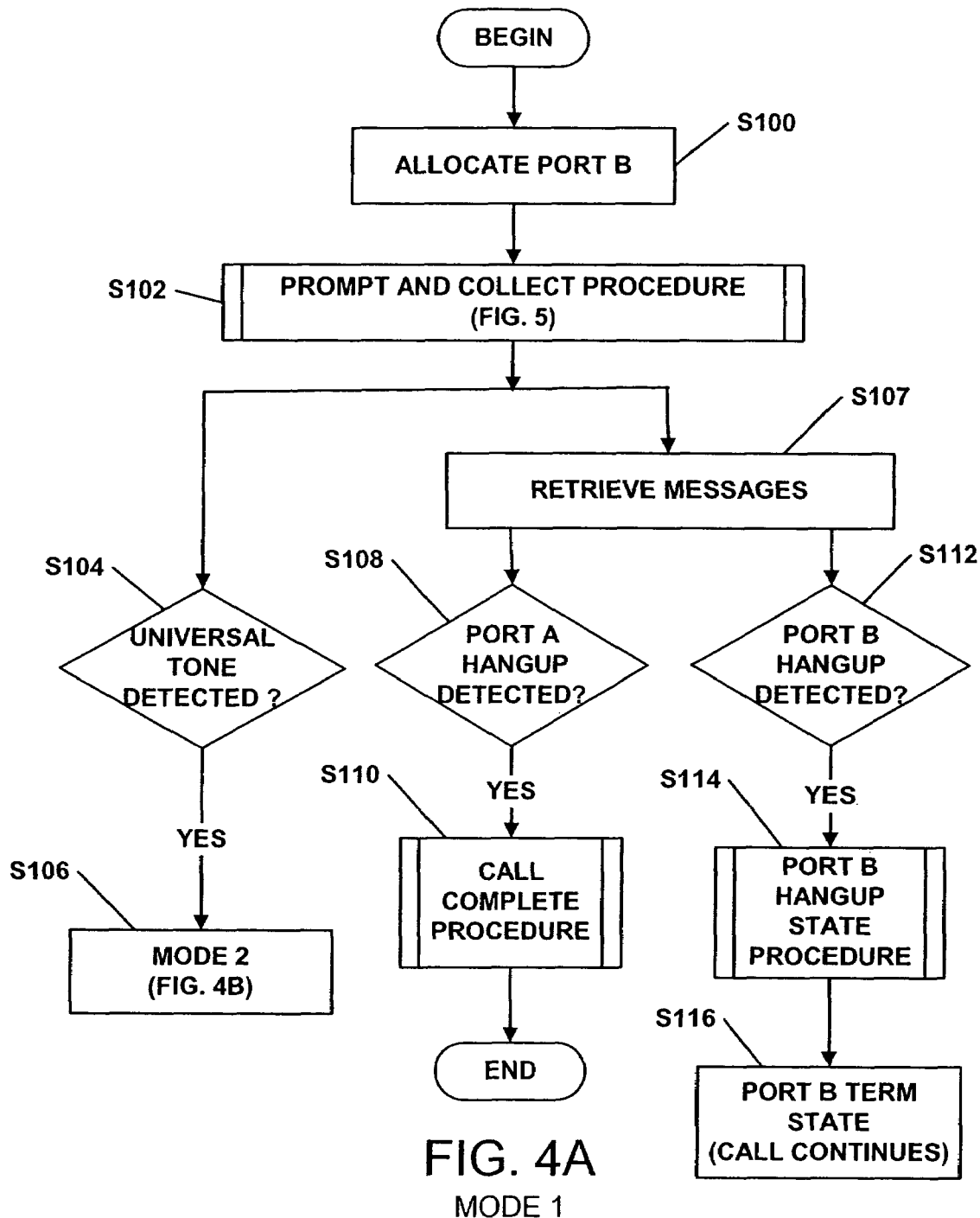
FIGS. 4A and 4B illustrate a general flowchart of the overall operation of the VC-to-DTMF interfacing system.
Figure 4B:
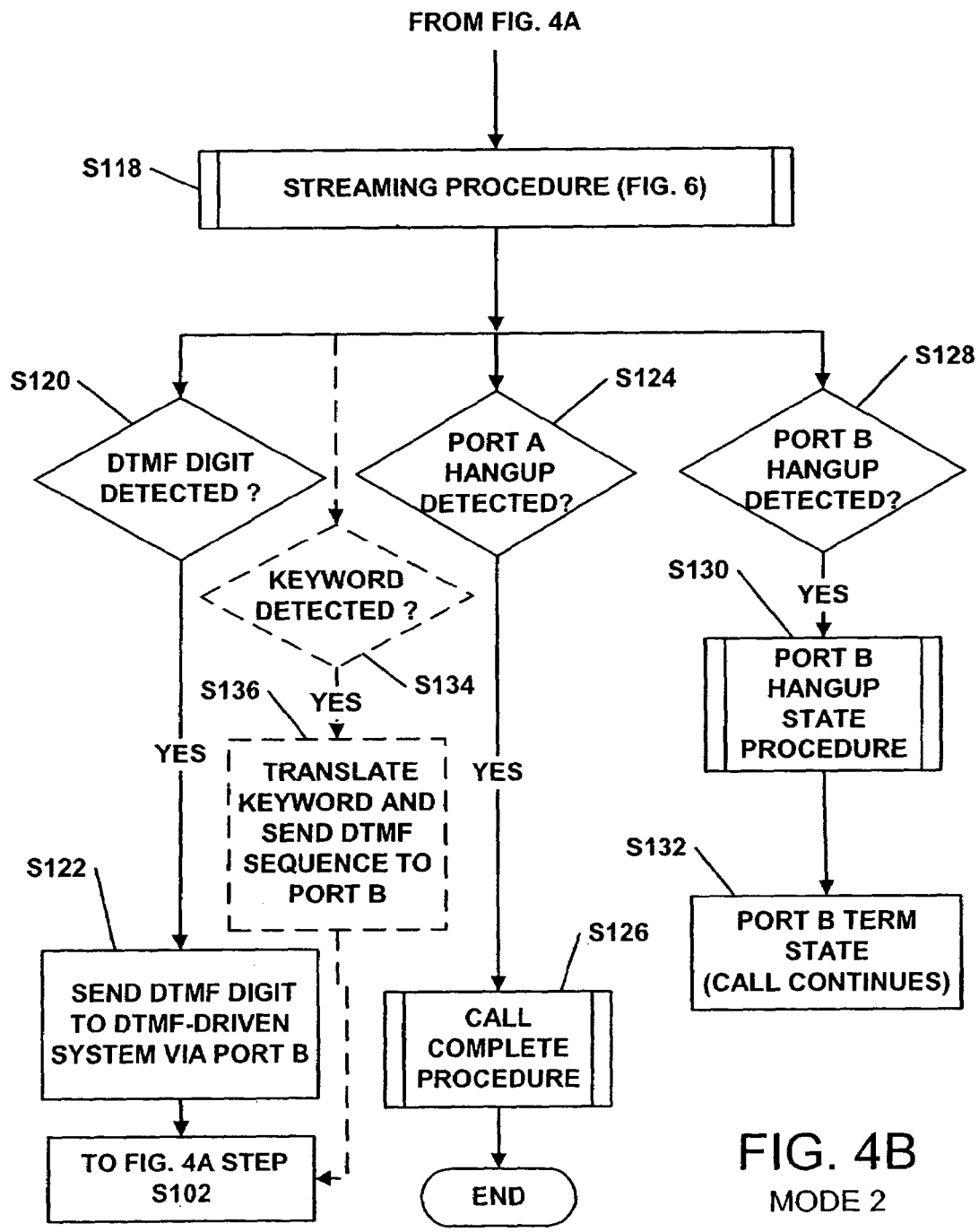

Referring now to FIGS. 4A and 4B, the overall flowchart of the operation of the VC-to-DTMF interfacing system 10 is shown. When a caller calls via telephone 12, the call is received on port A 18A. Port A 18A is one of many phone ports. When the call is received, the process begin at Step S100 where port B 18B is allocated. Step S100 is followed by Step S102 where the system begins with the prompt and collect procedure of mode 1. The prompt and collect procedure will be described in relation to FIG. 5. Step S102 can be followed by one of Steps S104 and S107.

Step S104 is a determination step as to whether a universal tone is detected by tone detector 28B. If the determination at Step S104 is "YES," mode 2 is entered at Step S106 for streaming operations and the process transitions to FIG. 4B.

On the other hand Step 107 is a step where based on the voice commands given by the caller, the DTMF-driven system 14 will retrieve messages from one of voice mail boxes $VBOX_1$, $VBOX_2$, ..., $VBOX_N$, or some other similar function, such that the caller's voice is not needed or used by the system 14. Step S107 is followed by one of Steps 108 or S112.

Step 108 is a determination step as to whether a hangup at port A 18A is detected. If the determination at Step S108 is "YES," a call complete procedure is entered at Step S110 and the process ends. As can be appreciated, a call complete de-allocates the ports A and B 18A, 18B, and re-initializes processes to wait for the next incoming call.

Step S112 is a determination step as to whether a hangup is detected at port B 18B. If the determination at Step S112 is "YES," port B 18B is deallocated in a hangup state procedure at Step S114. Step S114 is followed by Step S116 in which the call continues and system 10 waits for the next command from the caller.

Figure 6A:
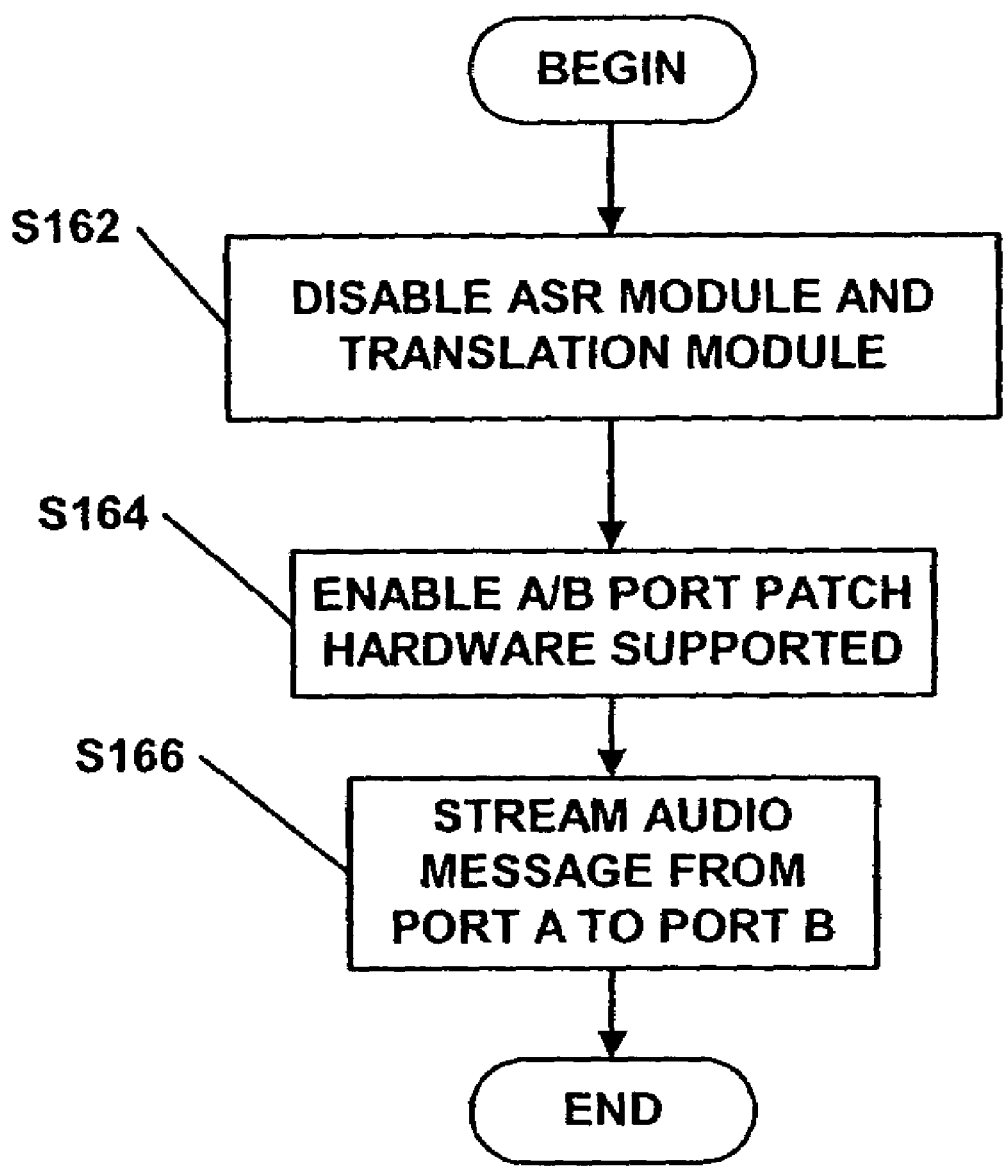
FIG. 6A illustrates a general flowchart of the streaming procedure in accordance with mode 2 of the present invention for use with the embodiment of FIG. 1.
Figure 6B:
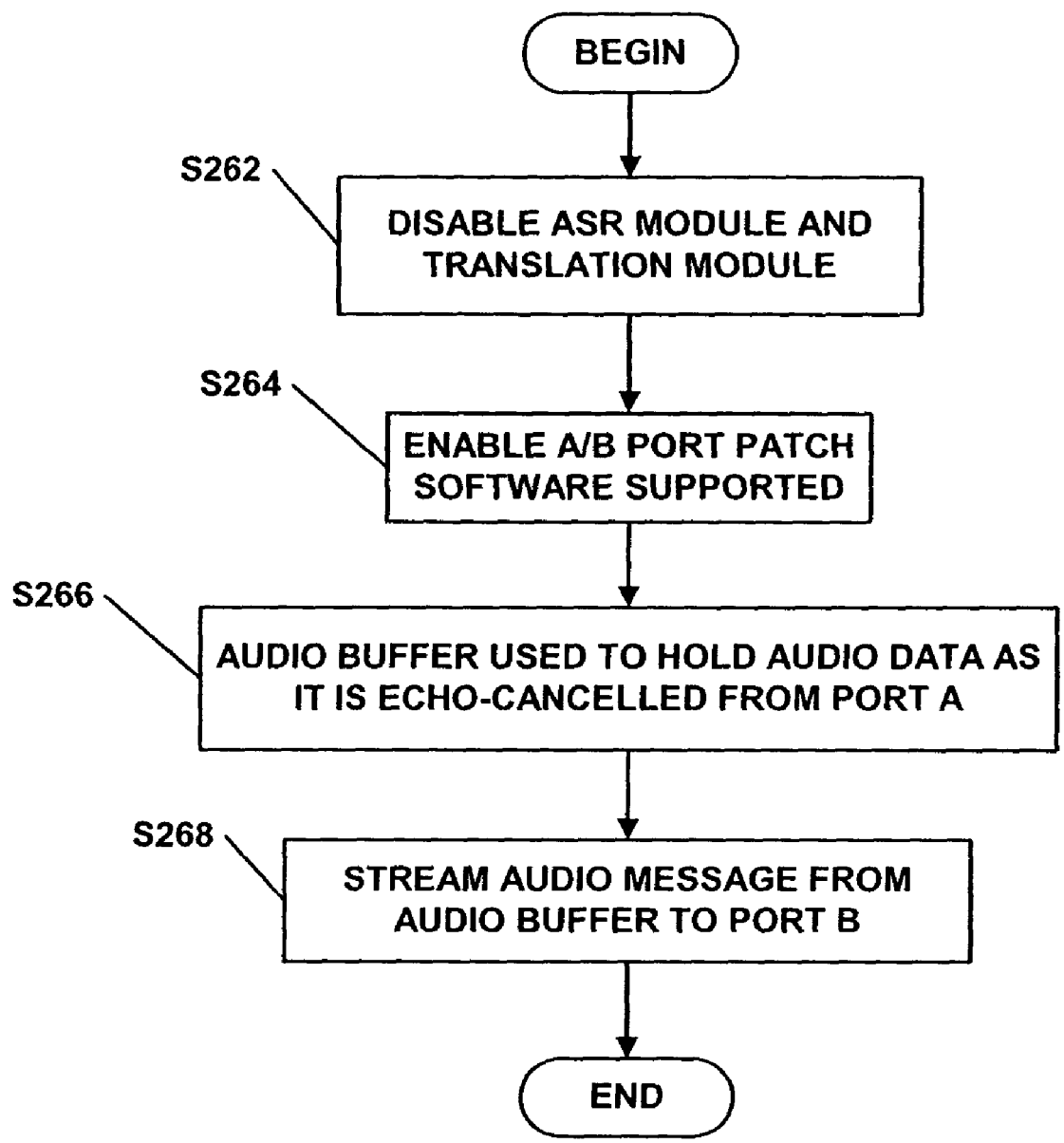
FIG. 6B illustrates a general flowchart of an alternate embodiment of the streaming procedure in accordance with mode 2 of the present invention for use with the embodiment of FIG. 2.

Referring now to FIG. 4B, when the universal tone is detected by tone detector 28B, the VC-to-DTMF interfacing system 10 transitions to mode 2. Mode 2 begins with the streaming procedure (i.e. mode 2) at Step S118. FIGS. 6A and 6B illustrate general streaming procedures. Step S118 is followed by one of Steps S120, S124, S128 or S134.

Step S120 is where a predetermined DTMF digit, such as, without limitation, a "#" is detected. If the determination at Step S120 is "YES," the DTMF digit is sent to port B through the A/B port patch 30 and then the system transitions back to mode 1. Alternately, in lieu of a DTMF digit, a keyword could be detected such as at Step S134 (shown in phantom). Step S134 is followed by Step S136 where the detected keyword detected by the ASR module 22 is translated by the DTMF translation module 24 and sent to port B. Thereafter, the system transitions back to mode 1.

Step 118 can also be followed by Step S124 or Step S128. Step S124 is a determination step as to whether a port A 18A hangup is detected. If the determination is "YES," a call complete procedure is entered at Step S126 and the process ends.

Step S128 is a determination step as to whether a hangup at port B 18B is detected. If the determination is "YES," a port B hangup state procedure is entered at Step S130 and in Step S132 the call continues and system 10 waits for the next command from the caller.

Figure 5:
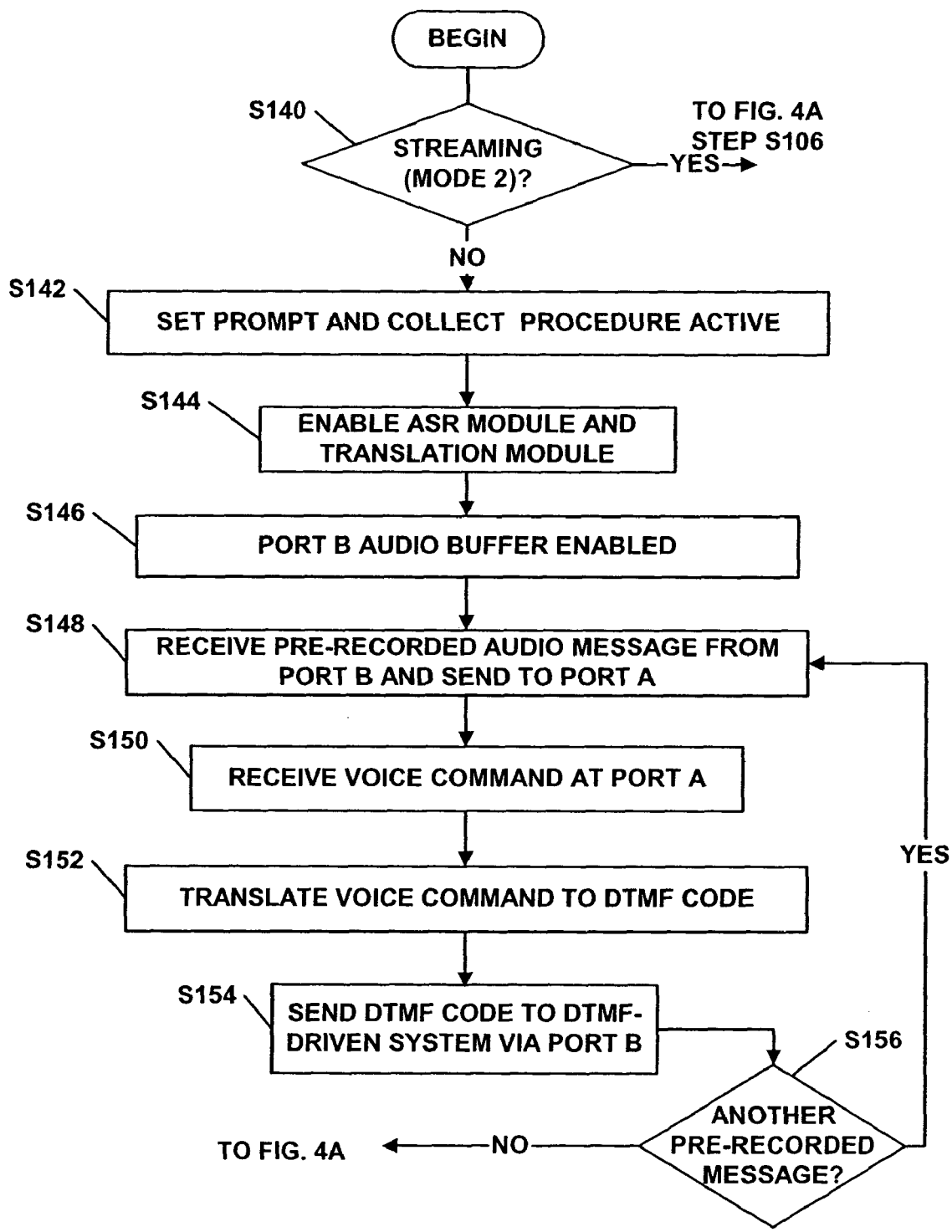
FIG. 5 illustrates a general flowchart of the prompt and collect procedure in accordance with mode 1 of the present invention.

Referring now to FIG. 5, the prompt and collect procedure flowchart is shown. The prompt and collect procedure begins at Step S140 where a determination is made that the streaming mode (mode 2) is not still ongoing. If the determination is "YES," the prompt and collect procedure does not commence until the streaming mode (mode 2) is complete. Step S140 is followed by Step S142 where the prompt and collect procedure is set active. The ASR module 22 and DTMF translation module 24 are enabled at Step S144. (However, if a keyword was used in the streaming mode 2, the grammar set for mode 2 in the ASR module 22 would be enabled.) It should be noted that keyword spotting in mode 2 requires its own grammar set. Likewise, mode 1 requires it own grammar set to be enabled in the ASR module 22 during mode 1. Step S144 is followed by Step S146 where the audio buffer 19 is enabled.

[0]The audio buffer 19 is used in mode 1, however it is used to buffer audio as it is recorded from the echo-canceller 20B of port B 18B. From the audio buffer 19 the audio is played through the voice-audio resource of port A 18A, thereby enabling the caller to hear the audio from the DTMF-driven system 14 such as to provide additional audio cues to the caller for the purpose of indicating when the system 14 is ready for a voice command.

Step S146 is followed by Step S148 where the VC-to-DTMF interfacing system 10 receives, via port B 18B, a pre-recorded audio message from port B 18B and sends an echo cancelled pre-recorded message to port A 18A.

Step S148 is followed by Step S150 where the VC-to-DTMF interfacing system 10 receives a voice command, via port A 18A. Step S150 is followed by Step S152 where the voice command is translated into the corresponding DTMF code. Step S152 is followed by Step 154 where the DTMF code is sent to port B for receipt by the DTMF-driven system 14. Thereafter, the DTMF-driven system 14 performs the necessary function associated with the DTMF code. In some instances, other pre-recorded messages need to be played. Hence, Step 154 is followed by Step S156 where a determination is made as to whether any more pre-recorded messages will be sent. It should be noted that the determination made in Step S156 is in part by the user (as the user can hear whether or not he or she has any more messages, for example), and partially by the system 10 (as the system my detect a hangup at port B 18B. If the determination is "YES," then the caller remains on the line keeping the call active, and the system continues to function by streaming audio from port B 18B to port A 18A while meanwhile sampling the caller's voice data from port A's echo canceller 20A to the ASR module 22. Thus, Step S156 effectively returns to Step 148. Step 148–156 are repeated until there are no more messages and the procedure continues to Step S107 of FIG. 4A, described above.

However, if the pre-recorded message is to be followed by the universal tone, such pre-recorded message for the purposes of this explanation can be considered the last pre-recorded message. The system 10 would wait for the detection of the tone at Step S104. More over, a hangup (Step S108) at port A 18A can be detected at any time during the process.

Referring now to FIG. 6A, the streaming operation of mode 2 is shown. The mode 2 begins at S162 where the ASR module 22 and the DTMF translation module 24 are disabled with respect to mode 1. If keyword spotting is used, then the ASR module 22 is re-enabled for the grammar set of mode 2. Step S162 is followed by Step S164 where the A/B port patch 30, implemented in hardware, is enabled. Thereafter, the audio data (voice message) is sent directly from port A 18A to port B 18B. The streaming procedure S118 ends when one of the DTMF digit is detected at Step S120, a keyword is detected at Step S134 or a hangup.

Referring now to FIG. 6B, an alternate embodiment of the streaming operation of mode 2 is shown. This mode 2 begins at S262 where the ASR module 22 and the DTMF translation module 24 are disabled. Step S262 is followed by Step S264 where the A/B port patch 30', implemented in software, is enabled. Step S264 is followed by Step S266 where the audio data (voice message) is sent to audio buffer 19B' (FIG. 2) as it is recorded with echo-cancellation from port A 18A. Step S266 is followed by Step 268 where the audio message from audio buffer 19B' is sent to port B 18B. The streaming procedure S118 ends when one of the DTMF digit is detected at Step S120, a keyword is detected at Step S134 or a hangup.

Accordingly, a voice command (VC) to DTMF interface systems 10 or 10' is provided that allows callers to interact with a DTMF-driven voice mail system using voice commands for providing hands-free operation. In an exemplary embodiment, the system of the present invention may be used to provide a voice interface to other types systems including, by way of non-limiting example, electronic mail systems.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A voice command (VC) to dual tone multi-frequency (DTMF) interfacing system comprising:
   a first echo canceller for echo canceling a received voice command from a caller in a first mode;
   a translator for translating the echo cancelled voice command into a DTMF code for use by a DTMF-driven system;
   a second echo canceller for echo canceling audio output sent to the caller from the DTMF-driven system;
   a first port for receiving a call from the caller;
   a second port for sending the DTMF code to and receiving the audio output from the DTMF-driven system;
   a port patch for connecting audio from the first port directly to the second port in a second mode; and
   a tone detector for detecting a tone, in the first mode, from the DTMF-driven system to switch to the second mode.

2. The system according to claim 1, further comprising:
   a DTMF digit detector for detecting a predetermined DTMF digit, in the second mode, from the caller to switch to the first mode.

3. The system according to claim 1, further comprising:
   a DTMF digit detector for detecting a predetermined DTMF digit, in the second mode, from the caller to switch to the first mode and to forward DTMF codes to the DTMF-driven system when voice commands are not used.

4. The system according to claim 1, wherein:
   during the second mode, the audio is a voice message to be stored in a voice mailbox of the DTMF-driven system; and
   during the first mode, the voice message stored in the voice mailbox can be retrieved.

5. The system according to claim 1, further comprising:
   an automatic speech recognition module for recognizing the voice command;
   wherein the translator includes:
   a plurality of audio files, each audio file corresponding to a DTMF tone wherein a distinct ordered combination of the plurality of audio files is associated with each voice command.

6. The system according to claim 5, wherein the translator further comprises:
   a DTMF audio file player.

7. A method of interacting with a dual tone multi-frequency (DTMF) driven system with voice commands comprising steps of:
   echo canceling a received voice command from a caller in a first mode;
   translating the echo cancelled voice command into a DTMF code for use by the DTMF-driven system;
   echo canceling audio output sent to the caller from the DTMF-driven system;
   receiving a call from the caller at a first port;
   sending the DTMF code to and receiving the audio output from the DTMF-driven system at a second port;
   enabling a port patch for connecting audio from the first port directly to the second port in a second mode;
   detecting a tone from the DTMF-driven system, in the first mode, to switch to the second mode; and
   enabling the port patch, in response to the detecting step.

8. The method according to claim 7, further comprising the steps of:
   detecting a predetermined DTMF digit, in the second mode, from the caller to disable the port patch; and
   disabling the port patch, in response to detection of the predetermined DTMF digit.

9. The method according to claim 7, further comprising the steps of:
   detecting a predetermined keyword, in the second mode, from the caller to disable the port patch; and
   disabling the port patch, in response to detection of the predetermined DTMF digit.

10. The method according to claim 9, wherein:
    during the second mode, the audio is a voice message to be stored in a voice mailbox of the DTMF-driven system; and
    during the first mode, the voice message stored in the voice mailbox can be retrieved.

11. The method according to claim 7, further comprising the step of:
    automatically recognizing the voice command;
    wherein the translating step includes:
    determining an ordered set of DTMF codes associated with the voice command, where each DTMF code has a one-to-one correspondence with an audio file containing an audio representation of that DTMF code.

12. The method according to claim 11, wherein the translating step further comprises the step of:
    playing the ordered set of DTMF audio files through a port connected to the DTMF-driven system.

13. A method of interacting with a dual tone multi-frequency (DTMF) driven system with voice commands, the method comprising steps of:
    receiving at a first port audio input from a user, the audio input comprising the voice commands;
    translating the voice commands into corresponding DTMF codes for use by the DTMF driven system;
    in response to the step of receiving, connecting to the DTMF driven system through a second port to receive audio output of the DTMF driven system and send the corresponding DTMF codes to the DTMF driven system;
    sending the audio output of the DTMF driven system to the user through the first port;
    detecting a tone from the DTMF driven system, the tone signaling the user to record a message;
    in response to detection of the tone, enabling a port patch for connecting audio input of the user from the first port directly to the second port.

* * * * *